United States Patent [19]
McCullough

[11] Patent Number: 5,944,611
[45] Date of Patent: Aug. 31, 1999

[54] CONVERTIBLE COUPLING FOR A TRANSMITTING TORQUE

[75] Inventor: Edward W. McCullough, Warren, Pa.

[73] Assignee: Rexnord Corporation, Milwaukee, Wis.

[21] Appl. No.: 08/979,390

[22] Filed: Nov. 26, 1997

Related U.S. Application Data

[63] Continuation of application No. 08/861,241, May 21, 1997, abandoned, which is a continuation of application No. 08/306,105, Sep. 14, 1994, abandoned.

[51] Int. Cl.⁶ .................................................. F16D 3/56
[52] U.S. Cl. .............................. 464/69; 464/94; 464/99
[58] Field of Search ................................ 464/69, 81, 98, 464/99, 100, 147

[56] References Cited

U.S. PATENT DOCUMENTS

| | | |
|---|---|---|
| 1,601,223 | 9/1926 | Naugler . |
| 1,685,158 | 9/1928 | Gold . |
| 2,181,888 | 12/1939 | Gustin ........................................ 464/69 |
| 2,745,267 | 5/1956 | Hagenlocher ......................... 464/99 X |
| 3,241,396 | 3/1966 | Magrum . |
| 3,494,147 | 2/1970 | Goody ....................................... 464/69 |
| 3,500,658 | 3/1970 | Goody . |
| 3,703,817 | 11/1972 | Orwin . |
| 3,791,170 | 2/1974 | Schmidt . |
| 3,808,837 | 5/1974 | Anderson . |
| 3,985,000 | 10/1976 | Anderson . |
| 4,019,346 | 4/1977 | Fukada . |
| 4,096,711 | 6/1978 | Carlson et al. ........................... 464/99 |
| 4,118,952 | 10/1978 | Kobayashi . |
| 4,196,597 | 4/1980 | Robinson ................................. 464/99 |
| 4,207,758 | 6/1980 | Stone . |
| 4,416,645 | 11/1983 | Fredericks ............................... 464/99 |
| 4,482,335 | 11/1984 | Goody ...................................... 464/94 |
| 4,708,692 | 11/1987 | Weiss ................................. 464/147 X |
| 4,741,722 | 5/1988 | Federn ..................................... 464/99 |
| 4,744,783 | 5/1988 | Downey et al. ......................... 464/99 |
| 4,747,802 | 5/1988 | Hille ......................................... 464/69 |
| 4,768,992 | 9/1988 | Mancuso et al. ........................ 464/69 |
| 4,871,277 | 10/1989 | Fuchigami ........................... 464/99 X |
| 4,943,261 | 7/1990 | Smith ....................................... 464/76 |
| 5,019,015 | 5/1991 | Wasserfuhr .............................. 464/99 |
| 5,221,232 | 6/1993 | Nameny ................................... 464/98 |

FOREIGN PATENT DOCUMENTS

| | | |
|---|---|---|
| 518414 | 11/1955 | Canada . |
| 0 082 797 | 6/1983 | European Pat. Off. . |
| 82979 | 6/1983 | European Pat. Off. . |
| 745134 | 5/1933 | France . |
| 827675 | 2/1938 | France . |
| 1337315 | 12/1963 | France . |
| 1427840 | 4/1966 | France . |
| 2313595 | 12/1976 | France . |
| 2609880 | 9/1977 | Germany . |
| 4315861 | 11/1994 | Germany . |
| 453436 | 12/1950 | Italy . |
| 62-194030 | 8/1976 | Japan . |
| 61-197822 | 9/1976 | Japan . |
| 4-78324 | 3/1992 | Japan . |
| 4-88210 | 3/1992 | Japan . |
| 288457 | 4/1928 | United Kingdom . |
| 924796 | 5/1963 | United Kingdom . |
| 1053395 | 4/1965 | United Kingdom . |
| 2065828 | 7/1981 | United Kingdom ..................... 464/98 |

OTHER PUBLICATIONS

Rexnord Corporation Coupling Opperation, Your Best ConnectionFor Close Coupled shafts (Series 54), 1988.

Thoma Flexible Coupling Full Line Catalog (Bulletin #88–1110), p. E–40, 1988.

Primary Examiner—Eileen Dunn Lillis
Attorney, Agent, or Firm—Michael Best & Friedrich LLP

[57] ABSTRACT

A flexible coupling for connecting a driving shaft and a driven shaft, the coupling including a first hub connected to the driving shaft, a second hub connected to the driven shaft, a set of flex elements located between the first hub and the second hub, a plurality of fasteners, and a series of bolt holes and clearance holes in the first and second hubs affording the alternative connection of the first and second hubs, the flex elements and the fasteners in a first arrangement wherein the coupling has a biased torque transmission capacity in a first direction of rotation and in a second arrangement wherein the coupling has a biased torque transmission capacity in a second direction of rotation.

20 Claims, 5 Drawing Sheets

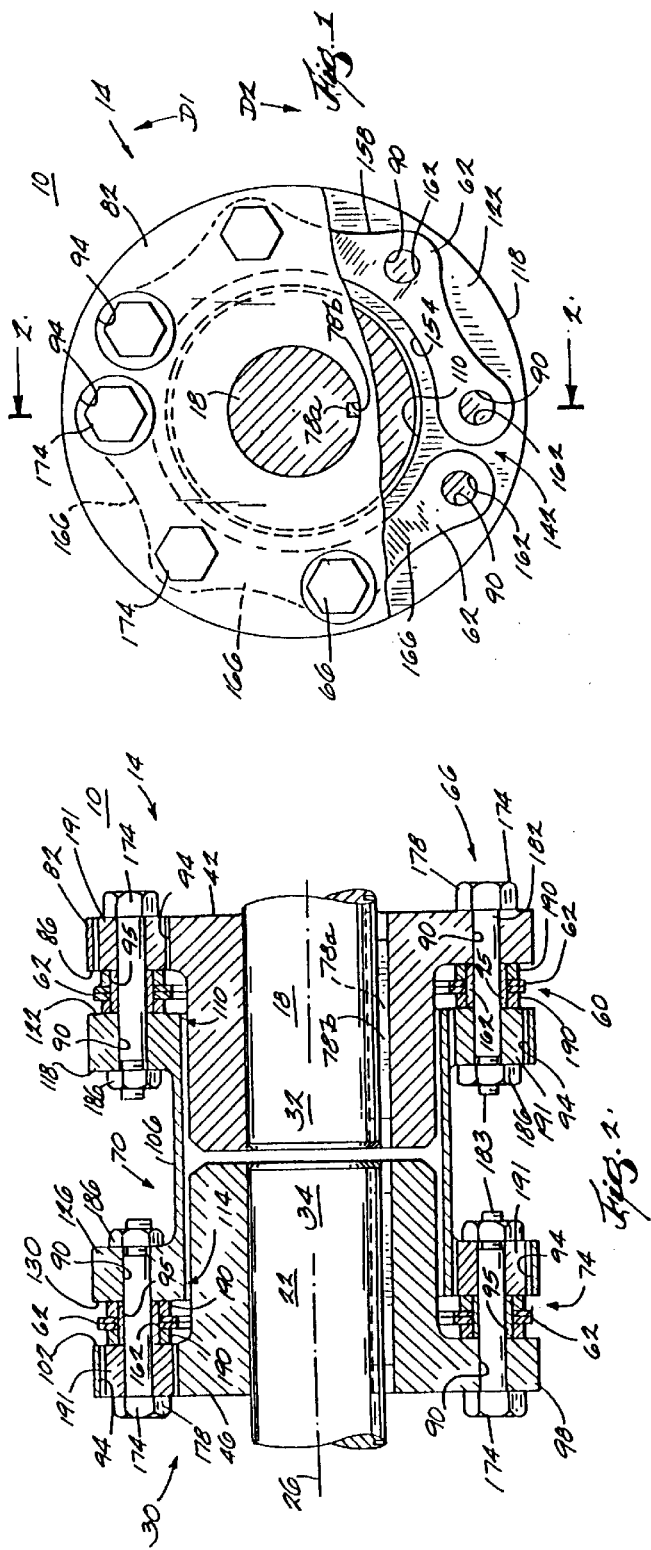
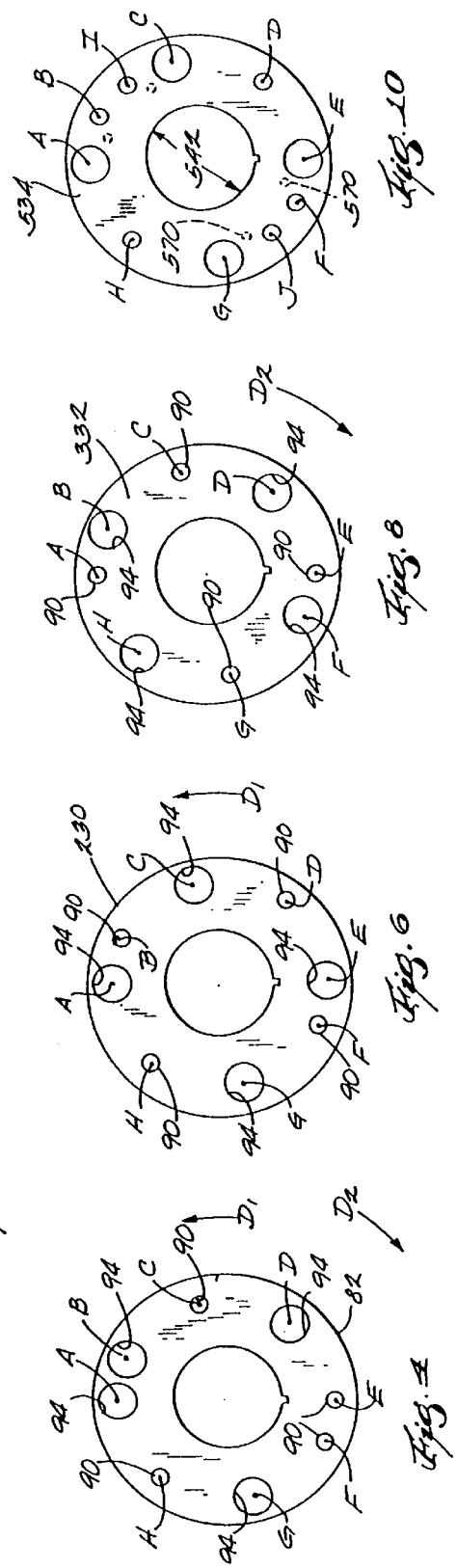

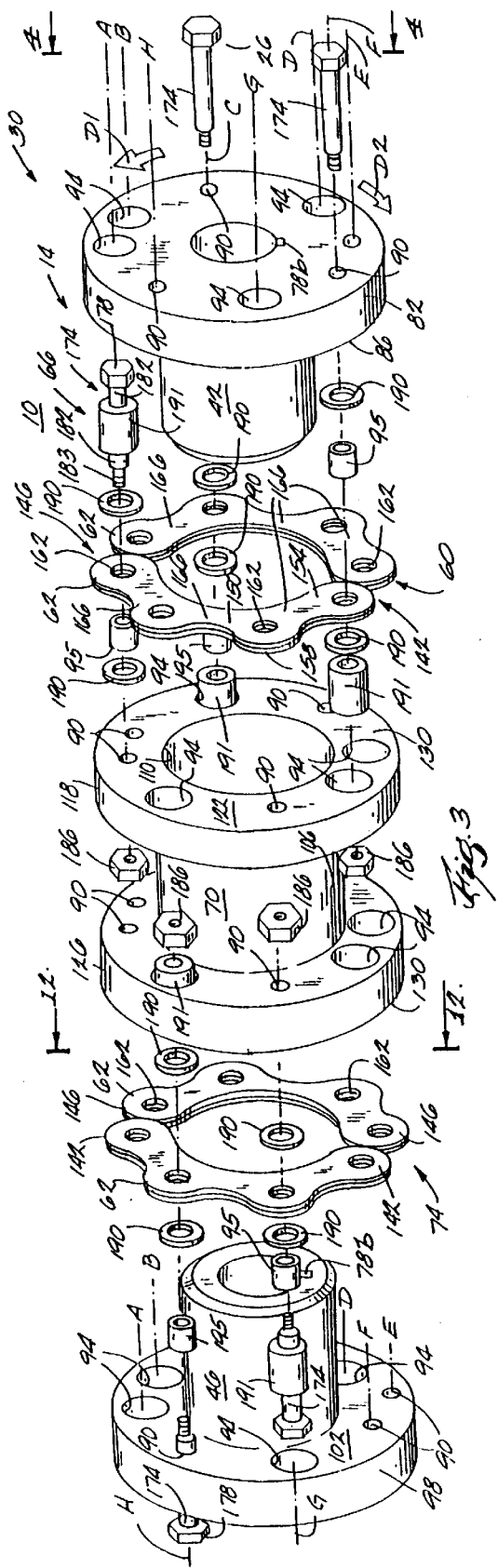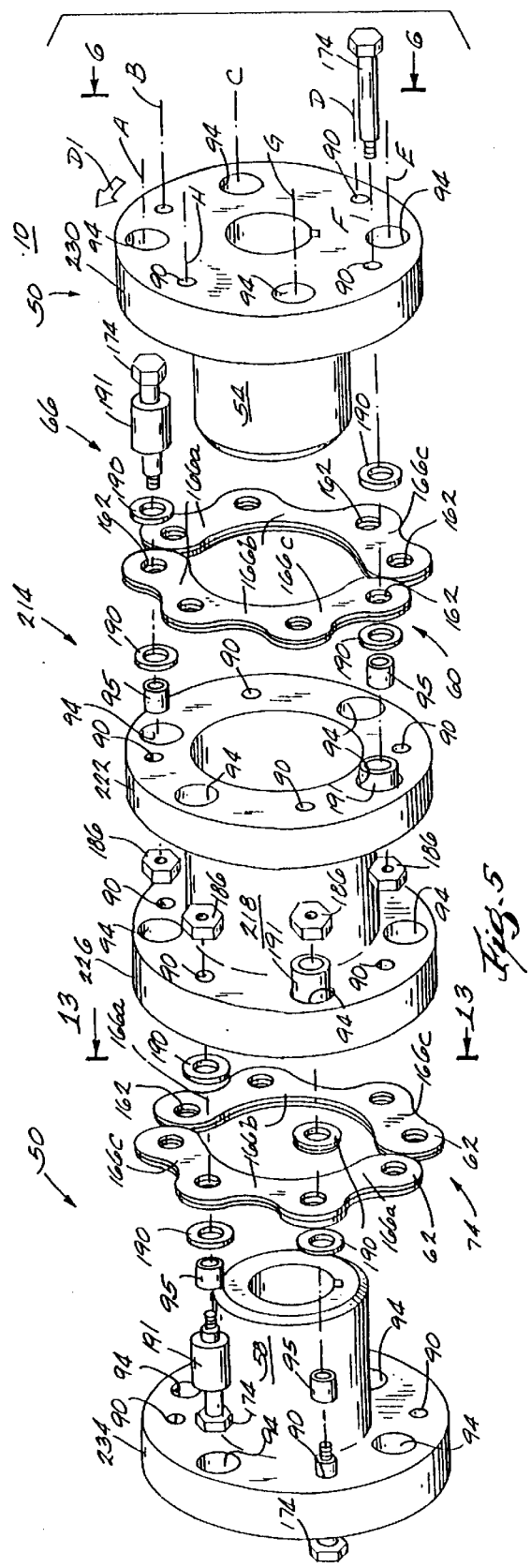

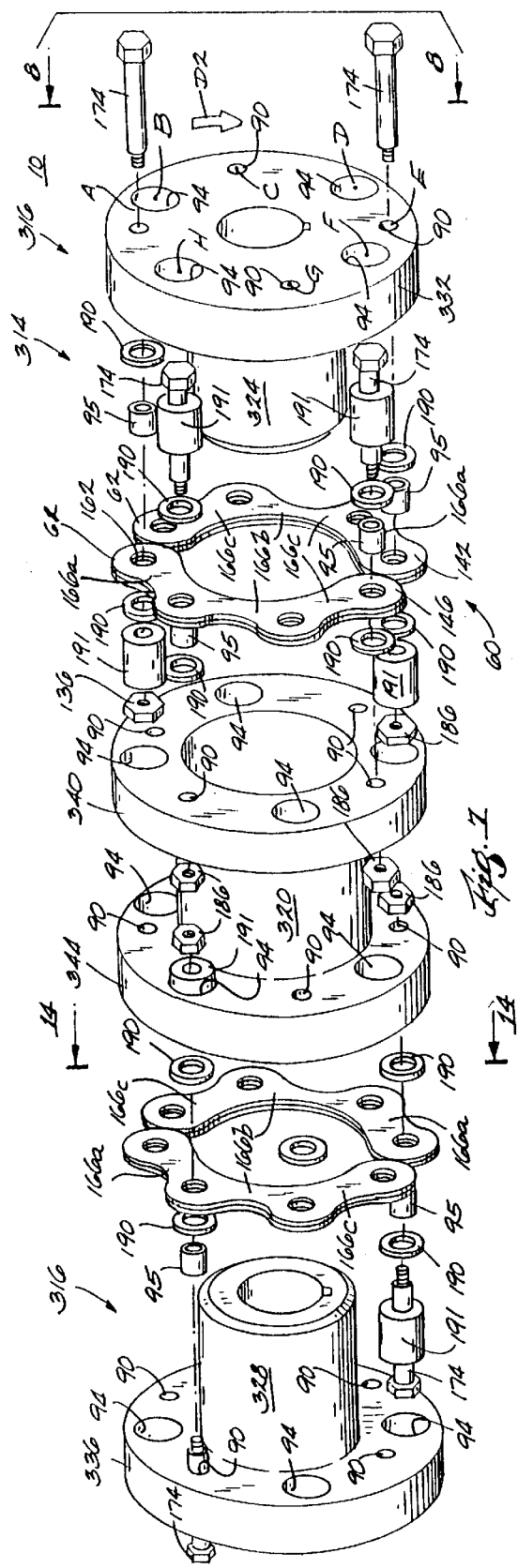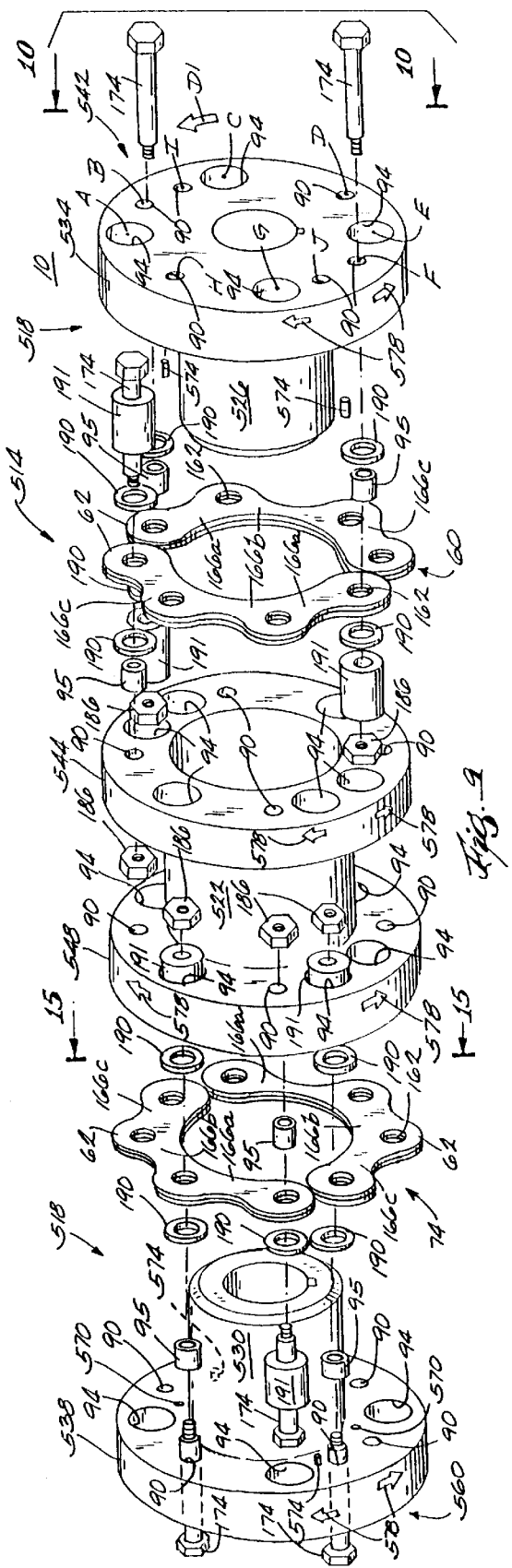

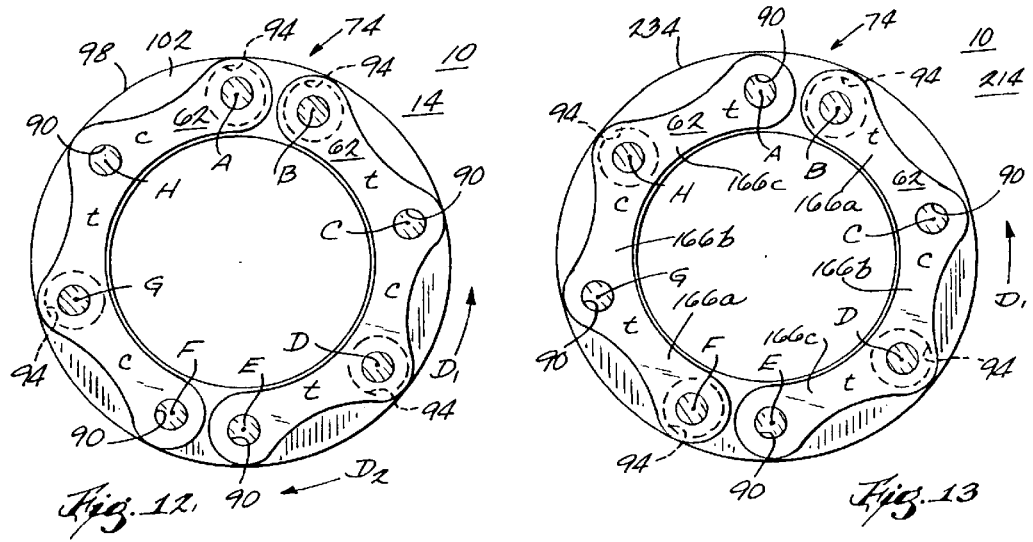
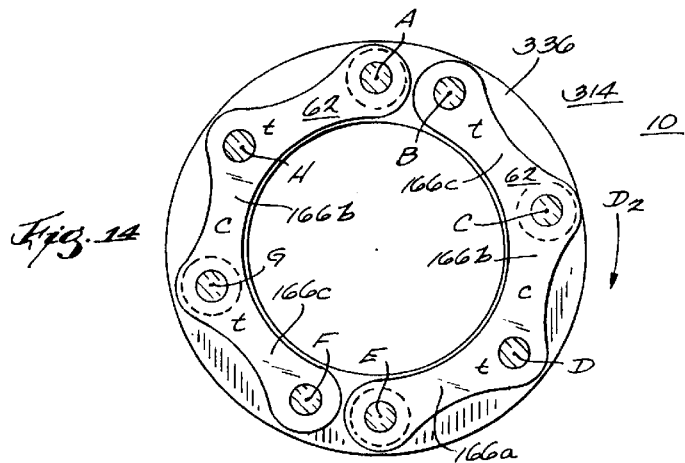
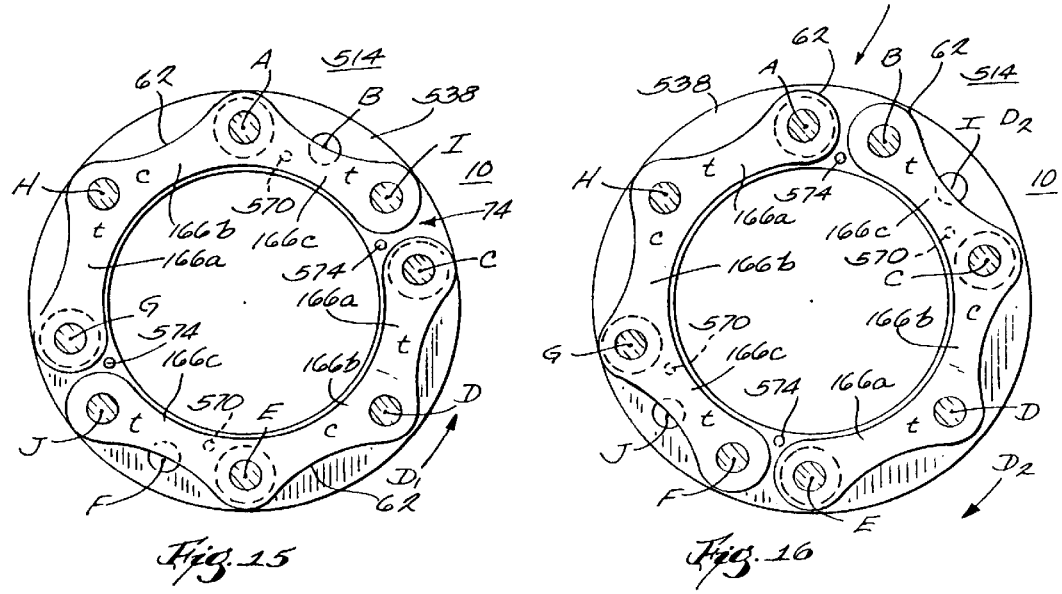

CONVERTIBLE COUPLING FOR A TRANSMITTING TORQUE

This is a continuation of U.S. patent application Ser. No. 08/861,241, filed May 21, 1997, now abandoned, which is a continuation of U.S. patent application Ser. No. 08/306,105, filed on Sep. 14, 1994, now abandoned

BACKGROUND OF THE INVENTION

1. Field of the Invention

The invention relates to devices for transmitting torque from a rotary power source to a driven device and for compensating for misalignment between the power source and the driven device. More particularly, the invention relates to flexible couplings for transmitting rotary power from a rotatable driving shaft to a rotatable driven shaft.

2. Discussion of Prior Art

Flexible torque transmission couplings are commonly used devices for connecting the ends of rotatable driving and driven shafts. The coupling includes a pair of flanked hubs respectively supported by the ends of the shafts. One or more flexible coupling elements are placed between and connected to the hubs, thereby enabling rotation of the driven shaft in response to rotation of the driving shaft. In the event the driving shaft and driven shaft are misaligned, the flexible coupling compensates for such misalignment without the need for repositioning the shafts.

In conditions wherein the ends of the driving and driven shafts are spaced too far apart for the hubs to be connected by flexible coupling elements, a tubular center member having opposite flanked ends is often provided to connect the hub flanges. The center member is connected at its opposite ends to the respective hub flanges by flexible coupling elements.

In conditions wherein the available space between the power source and the driven device is limited, the hubs on the driving and driven shafts may be inverted. In such an inverted hub arrangement, the ends of the shafts are closely spaced, and the flanges of the hubs remain spaced apart. Also, in an inverted hub arrangement, a tubular center member having opposite flanked ends is often provided to connect the hub flanges. The central member houses the respective ends of the shafts and is connected at its opposite ends to the respective hub flanges by flexible coupling elements.

Flexible transmission couplings can be constructed so that the coupling has a capacity to carry maximum torque load between the driving and driven shafts without regard to the direction in which the shafts rotate in common. Couplings having such a capacity are known as "bidirectional" couplings.

It is also known to provide a flexible torque transmission coupling having a capacity to transfer loads of a greater magnitude between the driving and driven shafts when the shafts rotate in common in a first direction than when the driving and driven shafts rotate in an opposite second direction. Such flexible couplings having different maximum torque transmission capacities dependent upon the direction of rotation of the driving and driven shafts are known as having a "biased" torque capacity. Flexible couplings having a biased torque capacity are commonly used in applications wherein the driving and driven shafts are capable of rotating in common in either of two directions and the loading therebetween is expected to be greater during rotation in one direction than in the other direction, and in applications wherein the shafts are capable of rotating in common only in a single direction.

SUMMARY OF THE INVENTION

It can be difficult to repair and maintain a flexible coupling because the equipment the coupling connects may be difficult to move. Also, repair and maintenance of known flexible couplings can be made difficult by the necessity of handling, disassembling and re-assembly couplings having numerous components.

Another problem presented by known flexible couplings is that coupling components are not interchangeable for use in applications requiring a bidirectional coupling or a coupling having a biased torque capacity. Also, components for couplings having a torque capacity which is biased in one direction of rotation are not interchangeable for use to provide couplings having a torque capacity biased in the opposite direction of rotation. As a result, the maintenance and repair or replacement of flexible couplings or components thereof must be carried out with care to assure that the coupling components are arranged to embody the proper coupling design and to perform the necessary torque transmission function. Also, separate inventories of coupling components must be maintained for use in bidirectional couplings, for couplings having a torque capacity biased in a first direction, and for couplings having a torque capacity biased in a second direction.

In addition, it can often be difficult to ascertain the type of coupling, i.e., the direction of the torque bias, if any, to which a component belongs, even after close inspection of the component. This also complicates the installation, maintenance and repair of flexible couplings, and also makes the maintenance of coupling component inventories more difficult.

In one embodiment, the invention provides a flexible coupling including a first hub which can be connected to a first rotatable shaft and a second hub which can be connected to a second rotatable shaft. The first and second hubs have respective radially extending flanges each of which have extending therethrough a set of bolt holes. The bolt holes are arranged circumferentially about the hub flanges in a specified pattern depending upon the intended use of the coupling, i.e., depending upon the direction of the bias of the coupling torque capacity. Each of the first and second hubs also has extending therethrough a set of clearance holes. The clearance holes are also arranged circumferentially about the hub flanges in a pattern corresponding to the pattern of the bolt holes.

The coupling also includes a plurality of flex elements located between the first hub flange and the second hub flange. The flex elements have opposite ends, a generally arcuate mid-section extending between the opposite ends, and a plurality of bolt holes. The bolt holes in the flex elements are arranged so that the bolt holes in the flex elements and the hub flanges can be aligned.

The coupling also includes a set of fastener assemblies, each of which include a threaded nut and bolt and each of which connect a flex element to one of the hub flanges. Depending upon the pattern of bolt holes in the hub flanges, the fastener assemblies connect the first and second hubs and the flex elements in an arrangement to provide a coupling having a torque capacity which is biased in either a first direction of rotation or in a second direction of rotation.

The fastener assemblies securely fasten a respective flex element to a respective hub flange, but also are easily disassembled for maintenance and repair of the coupling.

When the several fastener assemblies securing a flex element are disassembled, the flex element can be removed radially from between the hub flanges. Such removal of a single flex element is possible independent of the other of the pair of flex elements, and does not require movement or shifting of the connected hubs, shafts or other equipment.

One embodiment of the invention provides a coupling including first and second hubs connected to the first and second rotatable shafts and a center member located between the flanges of the first and second hubs and having opposite ends providing radially extending central member flanges. The coupling also includes a pair of the flex elements located between the first hub flange and one of the central member flanges and a pair of flex elements between the second hub flange and the other of the central member flanges. The coupling also includes two sets of fasteners: one of which connects the first hub, the pair of flex elements located between the first hub and the central member; and the other of which connects the second hub, the pair of flex elements located between the second hub, and the central member.

Regardless of whether the coupling is designed for use in a bidirectional application or a biased torque capacity application, the configurations of the flex elements and of the fastener assemblies remain the same. As a result, the invention provides a system for providing a coupling having either a bidirectional torque capacity or a biased torque capacity but requiring only unique hub configurations; common fastener assemblies and flex elements are used in all applications.

The coupling thus provides components which can be arranged and connected to provide a coupling having a biased torque capacity in either direction of rotation without requiring use of components which are uniquely configured dependent on the direction of bias of the coupling's torque capacity. Rather, common components, i.e., hubs, flex elements and fastener assemblies, are used in both alternative arrangements and the direction of torque capacity is determined solely by the arrangement and connection of components by the fasteners.

In another embodiment, the invention provides a system for providing a flexible coupling. The system includes a first set or pair of hubs and a second set of hubs. The sets of hubs are uniquely configured for use as components in a coupling having a particular torque transmission capacity, i.e. bidirectional or biased for unidirectional operation. The primary difference between the sets of hubs is the pattern of bolt holes and clearance holes in each. The system also includes a set of flex elements and a set of fasteners for connecting the first set of hubs and the second set of hubs. The configurations and numbers of flex elements and fasteners remains the same regardless of which set of hubs is used for the coupling. In some embodiments of the system, the different sets of hubs also include a uniquely configured center member.

The system thus can be used to provide a variety of flexible couplings which require only different hub and center member configurations, the remainder of the coupling components being common to each of the variety of possible couplings.

In another embodiment of the invention, the coupling includes indicia on the hub flanges for guiding the proper assembly of the coupling components into a coupling having a maximum torque capacity biased in the desired direction of rotation. Also, the coupling includes a mechanism whereby once the direction of rotation is properly determined, blocking pins can be placed in position in the hub flanges to indicate the proper positioning of the flex elements and fasteners and to prevent misassembly of the coupling components.

An advantage of the invention is provision of a flexible coupling including complementary pairs of semi-annular flexible elements which are independently removable in a radial direction from between closely spaced flanges without moving the rotary power source or the driven device. A related advantage is provision of a flexible coupling wherein the coupling is self-supporting when a flexible element is removed.

Another advantage of the invention is the provision of a system for providing flexible couplings which are usable in either bidirectional or unidirectional applications but which incorporate commonly configured components. This results in reduced inventories and simplified inventory management.

Another advantage of the invention is provision of a convertible flexible coupling which has a biased torque capacity in either a first direction or an opposite second direction. The direction of bias is determined solely by selecting the arrangement in which the flexible elements are connected to the hubs.

Another advantage is the provision of convertible flexible coupling components having markings which indicate the proper positioning and assembly of the components to obtain a coupling having the desired torque transmission characteristics.

Other features and advantages of the invention will become apparent to those skilled in the art upon review of the following detailed description, claims and drawings.

BRIEF DESCRIPTION OF THE DRAWINGS

FIG. 1 is an end view, partially broken away and partially in section, of a flexible coupling which is a first embodiment of the invention.

FIG. 2 is a cross-sectional view taken generally along line 2—2 in FIG. 1.

FIG. 3 is an exploded view of the flexible coupling shown in FIG. 2.

FIG. 4 is a view taken generally along line 4—4 in FIG. 3.

FIG. 5 is similar to FIG. 3 and illustrates a flexible coupling which is a second embodiment of the invention.

FIG. 6 is a view taken generally along line 6—6 in FIG. 5.

FIG. 7 is similar to FIG. 5 and illustrates a flexible coupling which is a third embodiment of the invention.

FIG. 8 is a view taken generally along line 8—8 in FIG. 7.

FIG. 9 is similar to FIG. 7 and illustrates a flexible coupling which is a fourth embodiment of the invention and which is illustrated in one of two possible arrangements.

FIG. 10 is a view taken generally along line 10—10 in FIG. 9.

FIG. 12 is a view taken generally along line 12—12 in FIG. 3.

FIG. 13 is a view taken generally along line 13—13 in FIG. 5.

FIG. 14 is a view taken generally along line 14—14 in FIG. 7.

FIG. 15 is a view taken generally along line 15—15 in FIG. 9 and illustrates the coupling in a first arrangement.

FIG. 16 is a view which is similar to FIG. 15 and illustrates the coupling in a second possible arrangement.

Figure 11:
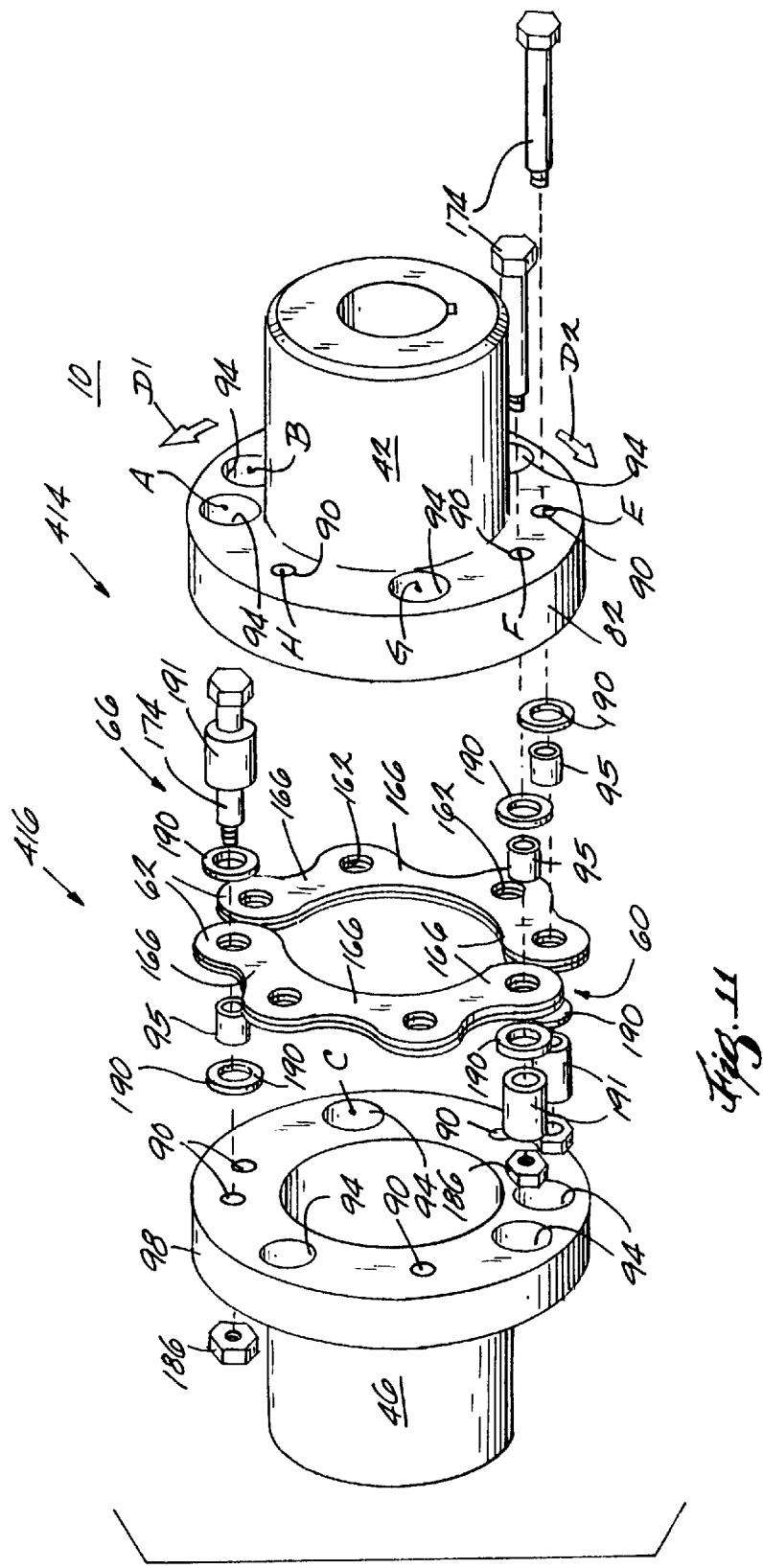
FIG. 11 is similar to FIG. 9 and illustrates a flexible coupling which is a fifth embodiment of the invention.

Before several embodiments of the invention are explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF A PREFERRED EMBODIMENT

The drawings illustrate a system 10 for providing a flexible coupling 14 for connecting and transmitting torque between a rotatable driving shaft 18 and a rotatable driven shaft 22. The driving and driven shafts 18, 22 are rotatable about respective axes 26 and have respective end portions 32, 34 and are rotatable in opposite first and second directions $D_1$ (counterclockwise in FIG. 3) and $D_2$ (clockwise in FIG. 3). As further described below, the flexible coupling 14 connects the driven shaft 22 to the driving shaft 18, so that the driven shaft 22 rotates in response to rotation of the driving shaft 18 and accommodates any misalignment therebetween that may exist.

In general, the system 10 for providing a coupling comprises the following components: a first set 30 or pair of hubs (shown in FIGS. 1–4) including a first hub 42 and a second hub 46, a second set 50 of hubs (shown in FIGS. 5 and 6) including a first hub 54 and a second hub 58, a set 60 of flex elements 62, and a set of fastener assemblies 66 which connect either the first set 30 or the second set 50 of hubs and the set 60 of flex elements 62 to provide a coupling connecting the driving and driven shafts 18,22. The system 10 also comprises a center member 70 and a second set 74 of flex elements 62 which can be used in addition to the hubs 42 and 46 and the set 60 of flex elements in various situations, such as, for example when the hubs are inverted on the shafts 18,22 or when the hubs are spaced apart a relatively large distance. The system 10 also comprises an alternative center member 218 for use with the second set 50 of hubs 54 and 58. In general, the system 10 provides alternative sets of hubs and center members having various configurations that are used with a common set or sets of flex elements and a common set of fastener assemblies to provide various alternative arrangements of couplings.

More particularly, the coupling 14 shown in FIGS. 1–4 includes the first hub 42 which is rotationally fixed to the end 32 of the driving shaft 18 in an inverted position by suitable fastening means 78. Although other suitable fastening means such as set screws can be used to fix the first hub to the shaft, in the illustrated embodiment the fastening means is a key 78a on the driving shaft 18 which is seated in a key way 78b in the first hub 42. Although in the illustrated embodiment the hub occupies an inverted position, in other embodiments the hub can occupy an extended position. The first hub 42 includes an annular, radially extending first hub flange 82 having a generally planar first hub flange face 86 which is spaced radially outwardly from, and which is perpendicular to, the driving shaft 18. The first hub flange 82 has extending therethrough (FIG. 12) four circumferentially spaced bolt holes 90, each of which are sized to receive the shank of a bolt in a manner discussed below. The first hub flange 82 also has extending therethrough four clearance holes 94 spaced circumferentially about the first hub flange 82. The clearance holes 94 are larger than the bolt holes 90 and are sized to housingly receive a safety pilot bushing 191 in a manner discussed below. The particular pattern and arrangement of the bolt holes 90 and clearance holes 94 about the first hub flange 82 is described in greater detail below.

The coupling 14 also includes (FIG. 2) the second hub 46 which is rotationally fixed to the end of the driven shaft 22 in an inverted position and which includes an annular, radially extending second hub flange 98. The second hub flange 98 defines a generally planar second hub flange face 102 which extends radially outwardly from, and perpendicular to, the shaft 22, and which faces the first hub flange face 86. The second hub flange 98 has extending therethrough (FIG. 3) four circumferentially spaced bolt holes 90 and four circumferentially spaced clearance holes 94. The specific pattern and arrangement of the bolt holes 90 and clearance holes 94 in the second hub flange 98 corresponds to that of the first hub flange 82 and is discussed with particularity below.

The coupling 14 also includes (FIG. 2) the generally cylindrical, one-piece center member 70. The center member 70 includes a generally tubular midportion 106 having opposite first and second ends 110, 114 which house the ends 32, 34 of the driving and driven shafts 18, 22 and portions of the first and second hubs 42, 46.

An annular first central member flange 118 extends radially outwardly from the first end 110 of the central member 70 and defines an annular, generally planar first central member flange face 122 which is in opposed facing relation to the first hub flange face 86. The first central member flange 118 has extending therethrough (FIG. 3) four circumferentially spaced bolt holes 90 and four circumferentially spaced clearance holes 94.

An annular second central member flange 126 (see FIG. 2) extends radially outwardly from the second end 114 of the central member 70 and defines an annular, generally planar second central member flange face 130 which is in opposed facing relation to the second hub flange face 102. The second central member flange 126 (FIG. 3) has extending therethrough four circumferentially spaced bolt holes 90 (three of which are shown in FIG. 3) and four circumferentially spaced clearance holes 94 (three of which are shown in FIG. 3). As explained in greater detail below, the arrangements of bolt holes and clearance holes 90, 94 in the first and second central member flanges 118, 126 correspond to and align with the arrangements of bolt holes and clearance holes 90, 94 in the first and second hub flanges 82, 98.

Each of the bolt holes 90 in the first and second hubs 42, 46 and the center member 70 aligns with a clearance hole 94. This alignment of bolt holes 90 and clearance holes 94 is afforded by arranging each of the bolt holes 90 and clearance holes 94 in one of several hole positions which are centered at a common radial distance from the axes 26 of rotation of the shafts and which are spaced circumferentially about the respective flanges 82, 98, 118, 126 of the first and second hubs 42, 46 and center member 70.

Referring first to FIGS. 3 and 4, the coupling 14 has eight hole positions (indicated by reference letters A-H). While many possible suitable arrangements of hole positions can be used, in the arrangement shown in FIGS. 1–4, the coupling 14 provides hole positions located at the following positions: Hole position A lies in the vertical plane extending generally through the axis 26 of rotation and is at a predetermined radial distance from the axis 26 (and is shown as being above the axis in FIGS. 3 and 4). Hole position A is referred to hereinafter as being located at 0°.

Hole positions B, C and D are circumferentially spaced from hole position A at angular displacements (clockwise in the figures) of about 30°, 80° and 130° respectively. Hole positions E, F, G, and H are respectively located 180° from hole positions A, B, C and D, i.e., at 180°, 210°, 260° and 310°, so that the eight hole positions A–H are arranged in four pairs of diametrically opposed hole positions.

Each of the bolt holes 90 and fastener holes 94 in the first hub 42, second hub 46 and center member 70 are located at one of hole positions A–H. The first hub flange 82 has (FIG. 4) bolt holes 90 located in hole positions C, E, F and H, and clearance holes 94 at hole positions A, B, D and G. The first center member flange 118 has (FIG. 3) bolt holes 90 aligned with the clearance holes 94 in the first hub flange 82, i.e., at hole positions A, B, D (partially shown) and G. The first center member flange 118 has clearance holes 94 aligned with the bolt holes 90 in the first hub flange 82, i.e., at hole positions C, E, F and H.

The second center member flange 126 has therein (FIG. 3) bolt holes 90 aligned with the bolt holes 90 in the first center member flange 118, and clearance holes 94 aligned with the clearance holes 94 in the first center member flange 118. More particularly, the second central member flange 126 has (FIG. 3) bolt holes 90 at hole positions A, B, D (not shown) and G, and clearance holes 94 at hole positions C (not shown), E, F and H.

The second hub flange 98 (see FIGS. 3 and 12) has therein bolt holes 90 aligned with the clearance holes 94 in the second center member flange 126 and has therein clearance holes 94 aligned with the bolt holes 90 in the second center member flange 126. More particularly, the second hub flange 98 has bolt holes 90 at hole positions C (not shown in FIG. 3), E, F and H, and has clearance holes 94 at hole positions A, B, D and G.

The coupling 14 also includes the first and second pairs or sets 60, 74 of flex elements 62; the first pair 60 is located between the first hub flange face 86 and the first center member flange face 122, and the second pair 74 is located between the second center member flange face 130 and the second hub flange face 102. The flex elements 62 are identical. For the purposes of describing the pairs 60, 74 of flex elements 62, the flex element 62 appearing on the left in the drawings will be referred to as the first flex element, and the flex element appearing on the right in the drawings will be referred to as the second flex element.

Each flex element 62 is a unitary member having opposed front and rear faces and a generally uniform thickness. Although the flex elements 62 can be made of any suitable material, in the illustrated embodiment, each flex element 62 consists of a plurality or stack of thin sheets of stainless steel laminated together to provide a unitary, single-piece member which is flexible and which has high tensile strength. In an alternative embodiment, the stack of sheets can be encapsulated in a polymeric encapsulant. Each flex element 62 has opposite first and second ends 142, 146 and a generally arcuate central portion 150 extending between the opposite ends 142, 146. The radial inner or concave edge 154 of the flex element 62 is generally smooth. The radial outer or convex edge 158 is generally escalloped. The central portion 150 of the flex element 62 has extending therethrough four spaced-apart bolt holes 162 each of which is the same size as the outside of a bushing 95. One of the bushings 95 extends through each bolt hole 162.

The bolt holes 162 in the flex element 62 delineate (FIG. 3) therebetween three chords 166 of material. The chords will be referred to as first, second and third chords 166a, 166b, 166c in order from the leading end of the flex element 62 and with respect to the direction of rotation of the coupling 14. When the flex elements 62 are connected to the first or second hubs 42, 46 and to the center member 70, and when the shafts 18, 22 are rotated, the chords 166 of the flex elements 62 are placed under either compressive or tensile forces as the coupling 14 transfers torque between the shafts 18, 22. As explained in more detail below, this loading on a flex element 62 is determined by the manner of connection of the flex element 62 to the first and second hubs 42, 46 and center member 70. Also, the connection of the flex elements 62 to the hubs 42, 46 and center member 70 determines the torque transmission characteristics of the coupling 14.

The first and second pairs 60, 74 of flex elements 62 are arranged in end-to-end relation to form substantially circular arrays, so that the apertures 162 in the flex elements 62 are arranged circumferentially and can be aligned with respective bolt holes 90 in the flanges 82, 98, 118 and 126 of the hubs and center member.

The coupling also includes the plurality of fastener assemblies 66. Pairs of fastener assemblies 66 connect a flex element 62 to either the first hub 42, the second hub 46 or the center member 70. For the purpose of simplifying the illustration and description of the coupling 14, only five fastener assemblies 66 are shown in FIG. 3. However, in practice, the coupling 14 includes a total of sixteen fastener assemblies 66 which can be considered to be a set: four fastener assemblies 66 connect the first pair 60 of flex elements 62 to the first hub flange 82; four fastener assemblies 66 connect the first pair 60 of flex elements 62 to the first center member flange 118; four fastener assemblies 66 connect the second pair 74 of flex elements 62 to the second hub flange 98; and four fastener assemblies 66 connect the second pair 74 of flex elements 62 to the second center member flange 126.

The fastener assemblies 66 include identical components which are assembled in slightly different arrangements, depending upon whether the flex element 62 is being connected to a hub flange 82, 98 or a center member flange 118, 126. Each fastener assembly 66 includes a shoulder bolt 174 having a head 178, a shank 182 including a shoulder and a threaded end portion 183, and a nut 186 which is threadable on the shank 182. Each bolt 174 extends through a bushing 95 and thus through a bolt hole 162 in a flex member 62, and through a bolt hole 90 in either a hub flange 82, 98 or a center member flange 118, 126, to connect the flex element 62 to the respective flange. Each fastener assembly 66 also includes the bushing 95 through which the bolt shank 182 extends. Each fastener assembly 66 also includes a pair of washers 190 through which the bushing 95 extends. The washers 190 are located on opposite sides of the flex element 62 through which the associated bushing 95 and bolt 174 extend. Thus, one washer of each pair of washers 190 is engaged between a hub flange face 86, 102 and the flex element 62, and the other washer of each pair of washers 190 is engaged between the flex element 62 and a center member flange face 122, 130. Each fastener assembly 66 also includes a safety pilot bushing 191. The safety pilot bushing 191 is received in the clearance hole 94 opposite from the bolt hole 90 through which the bolt 174 extends. Thus, the safety pilot bushing 191 is adjacent and engaged by the bushing 95 and either the bolt head 178 or nut 186, depending upon which is adjacent the clearance hole 94. In the specific embodiment illustrated, each bolt is inserted with the head 178 adjacent the respective hub flange 82, 98 and with the nut 186 adjacent the respective center member flange 118, 126. Thus, in the specific embodiment illustrated, when the bolt extends through a bolt hole 90 in a hub flange 82,98, the safety pilot bushing 191 is received adjacent the nut 186 in a clearance hole 94 in the respective center member flange 118,126. Also in the specific embodiment illustrated, when the bolt extends through a bolt hole 90 in a center member flange 118,126, the safety pilot bushing 191 is received adjacent the bolt head 178 in a clearance hole 94 in the respective hub flange 82,98.

As best shown in FIG. 2, the fastener assemblies 66 are positioned so that the bolt head 178 of each fastener assembly 66 points axially away from the coupling 14 and bears against either one of the first or second hub flanges 82, 98 or a safety pilot bushing 190 housed by a clearance hole 94 in one of the hub flanges 82, 98. Accordingly, the nut 186 of each fastener assembly 66 bears against either one of the central member flanges 118, 126 or the safety pilot bushing 190 housed by a clearance hole 94 in one of the center member flanges 118, 126.

Referring particularly to the fastener assemblies 66 shown in FIG. 2 connecting the first hub 42, the first pair 60 of flex elements 62 and the first center member flange 118, the fastener assembly 66 located in hole position E (the lower right fastener assembly in FIG. 2) has a bolt head 178 bearing against the hub flange 82 opposite the first hub flange face 86. The bolt shank 182 extends through the bolt hole 90 in the hub flange 82, through a bushing 95, through a safety pilot bushing 191, and is threaded into a nut 186. The bushing 95 extends through one of the washers in the pair of washers 190, one of the bolt holes 162 in a flex element 62, and the other washer in the pair of washers 190. One of the washers in the pair of washers 190 is engaged between the first hub flange face 86 and the flex element 62, and the other washer in the pair of washers 190 is engaged between the flex element 62 and the first center member flange face 122. The flex element 62 bears against the pair of washers 190. The safety pilot bushing 191 is received in the clearance hole 94 at position E in the first center member flange 118. The safety pilot bushing 191 is engaged between the washer 190 and the nut 186. Thus, the bolt 174 and nut 186 threaded thereon are in tension, with the bolt head 178 bearing against the hub flange 82 opposite the first hub flange face 86 and with the nut 186 bearing against the safety pilot bushing 191. The safety pilot bushing 191, bushing 95, pair of washers 190 and flex element 62 are compressed between the nut 186 and the first hub flange face 86.

The fastener assembly 66 connecting a flex element 62 in the pair of flex elements 74 and the second center member flange 126 and located in hole position A (the upper left fastener assembly in FIG. 2) has the bolt head 178 bearing against a safety pilot bushing 191. The bolt shank 182 extends through the safety pilot bushing 191, the bushing 95, through the bolt hole 90 in position A in the second center member flange 126, and is threaded into the nut 186. The bushing 95 extends through the pair of washers 190 and one of the bolt holes 162 in the flex element 62. The safety pilot bushing 191 is received in the clearance hole 94 at position A in the second hub flange 98. The safety pilot bushing 191 is engaged between the bolt head 78 and the washer 190. Thus, the bolt 174 and nut 186 threaded thereon are in tension, with the bolt head 178 bearing against the safety pilot bushing 191 and with the nut 186 bearing against the second center member flange 126 opposite the second center member flange face 130. The safety pilot bushing 191, bushing 95, pair of washers 190 and flex element 62 are compressed between the bolt head 178 and the second center member flange face 130.

Each flex element 62 of either the first or second pairs 60, 74 of flex elements 62 can be removed individually in a radial direction from between adjacent flanges without removing the other flex element 62 of the pair, without moving the center member 70 or shafts 18, 22, and without moving or disturbing the pieces of equipment to which the shafts 18, 22 are connected. Similarly, a new flex element 62 can be inserted between adjacent flanges in a radial direction. A flex element 62 can be so replaced by disassembling the fastener assemblies 66 connecting a flex element 62 to opposed-facing flanges, removing the flex element 62 from between the flanges in a radial direction, inserting a new flex element 62 between the flanges in a radial direction, and reassembling the fastener assembly 66 to connect the new flex element 62 to the adjacent flanges. Thereafter, the other flex elements 62 can be replaced in a similar manner.

FIGS 5, 6 and 13 illustrate a coupling 214 which is provided by the system 10 and which is a second embodiment of the invention. The coupling includes the alternative pair or second set 50 of hubs and an alternative center member 218. Except as otherwise described, the coupling 214 including the second set 50 of hubs and center member is identical to the coupling 14 including the first set 30 of hubs and center member, and common elements are identified by common reference numerals. The primary difference between the couplings 14 and 214 is that the coupling 214 includes hubs 54 and 58 differing from the first pair 38 of hubs, and a center member 218 having first and second center member flanges 222, 226 different from those provided by the first center member 70.

More particularly, the second set 50 of hubs 54 and 58, when connected by a set or sets of flex elements 62 and a set fastener assemblies 66, provides a coupling having a torque transmission capacity which is biased in the direction indicated by $D_r$. This torque transmission capacity characteristic is provided through the arrangement of bolt holes 90 in the second set 50 of hubs 54,58 and in the center member flanges 222, 226.

The second set 50 of hubs includes the first and second hubs 54, 58 having respective flanges 230, 234 and the center member 218 having first and second central member flanges 222, 226. In the first hub flange 230 (see FIGS. 5 and 6), bolt holes 90 are present at hole positions B, D, F, and H and clearance holes 94 are present at hole positions A, C, E and G. As shown in FIG. 5, the first center member flange 222 has therethrough bolt holes 90 located at hole positions A, C, E and C, and has therethrough clearance holes 94 located at hole positions B, D, F and H. As also shown in FIG. 5, the second center member flange 226 has therethrough bolt holes 90 located at hole positions B, D (not shown), F and H, and has therethrough clearance holes 94 located at hole positions A, C (not shown), E and G. In the second hub flange 234 (see FIGS. 5 and 13), bolt holes 90 are present at hole positions A, C (not shown in FIG. 5), E and G, and clearance holes 94 are present at hole positions B, D, F and H.

In general, the system 10 for providing a coupling depends upon the particular configuration of the set of hubs used to assemble the coupling for the determination of the torque transmission characteristics of the coupling. More specifically, depending upon the particular pattern of bolt holes and clearance holes in the first and second hub flanges, and in the center member flanges if present, the coupling has either a bidirectional or biased torque transmission capacity.

Further, if the coupling has a biased torque transmission capacity, by definition the bias is directed either in one direction of rotation, e.g. in the direction indicated by D, or in the opposite direction indicated by $D_2$. Regardless of whether the torque transmission capacity is bidirectional or biased, common flex elements 62 and fastener assemblies 66 are used to connect the first and second hubs and, if present, the center member.

The hub configurations provided by the system 10 determine the torque transmission capacity of the coupling because the connections between the hub and center member flanges and the flex elements 62 and the direction of loading on the coupling determine the nature of the resultant loading on the flex elements 62 during operation of the coupling, i.e., determines the number of chords 166 in the flex elements 62 that are subjected either to compressive loads or tensile loads.

The chords 166 in the flex elements 62 have a greater capacity to carry tensile loads than compression loads, so the greater the number of chords 166 in the flex elements 62 that are loaded by tensile forces, the greater the coupling's capacity to transfer torque. A bidirectional coupling has equal numbers of chords 166 placed under tension and compression regardless of the coupling's direction of rotation and the direction of loading on the coupling, and accordingly has equal maximum torque capacities in both directions. A coupling having a biased torque capacity has unequal numbers of chords placed under tension and compression. Therefore, such a coupling has a greater capacity to transfer torque in the direction in which a larger number of chords are placed under tension, and a lesser torque transmission capacity in the opposite direction, i.e. in the direction in which a greater number of chords are loaded by compressive forces.

For example, the first pair 30 of hubs 42, 46 and the center member 70 included in the coupling 14 are configured to provide the coupling 14 with a bidirectional torque capacity. Referring to FIG. 12, when the shafts 18, 22 rotate in the first direction $D_1$, the first chord 166a in each first flex element 62 is in tension (as indicated by the symbol t); the second chord 166b is in compression (as indicated by the symbol c); and the third chord is in tension. Also when the shafts 18, 22 rotate in the first direction $D_1$, the first chord 166a in each second flex 62 element is in compression, the second chord is in tension, and the third chord is in compression. The coupling 14 thus includes an equal number of flex element chords under tension and compression.

Also referring to FIG. 12, when the driving shaft 18 rotates in the direction $D_2$, the load on each chord 166 is reversed, but still results in an equal number of flex element chords 166 being placed under tension or compression. Thus, the coupling 14 is operable in either opposite direction $D_1$ or $D_2$, and is capable of transmitting an equal amount of torque when rotated in either direction.

In comparison, th e coupling 214 including the second set 50 of hubs has a biased torque capacity, because during operation unequal numbers of chords 166 are placed under tensile and compressive loading. When the driving shaft 18 rotates the coupling 214 in the first direction $D_1$ (see FIG. 13), the first chord 166a in each first flex element 62 is in tension, the second chord 166b is in compression, and the third chord 166c is in tension. Also when the driving shaft 18 rotates in the first direction $D_1$, the first chord 166a in each second flex element 62 is in tension, the second chord 166b is in compression, and the third chord 166c is in tension. Thus, when the flexible coupling 214 is rotated in direction $D_1$, each pair of flex elements 62 includes four tension chords and two compression chords. This greater number of tension chords gives the coupling 214 a greater torque capacity than a coupling having fewer tension chords. If the coupling 214 is rotated in the opposite direction $D_2$, the loading on the chords 166 is reversed and each pair of flex elements 62 includes only two tension chords and four compression chords, which results in a diminished torque transmission capacity.

The coupling 214 including the second set 50 of hubs therefore has a greater capacity to transmit torque in the direction $D_1$ than in the second direction $D_2$, and therefore has a torque transmission capacity biased in the direction of $D_1$. When rotated in the second direction $D_2$, opposite direction $D_1$, the flexible coupling 214 is capable of transmitting about 50% of the torque transmissible in the first direction $D_1$.

FIGS. 7, 8 and 14 illustrate a coupling 314 which is a third embodiment of the invention which is provided by the system 10, and which includes a third set 316 of hubs and center member. The coupling 314 includes a third set 316 of hubs 324, 328 and an alternative center member 320. Except as otherwise described, the coupling 314 including the third set 316 of hubs and center member is identical to the coupling 14 and common elements are identified by common reference numerals.

More particularly, the system 10 utilizing the third set 316 of hubs and center member connected by a set of flex elements 62 and set of fastener assemblies 66 provides a coupling 314 having a torque transmission capacity which is biased in the direction indicated by $D_2$. The third pair 316 of hubs includes a first hub 324 having flange 332, a second hub 328 having flange 336 and a center member 320 having flanges 340, 344. In the first hub flange 332 and second center member flange 344 (see FIGS. 7 and 8), bolt holes 90 are present at hole positions A, C, E and G and clearance holes 94 are present at hole positions B, D, F and H. In the first center member flange 340 and second hub flange 336, bolt holes 90 are present at hole positions B, D, F and H and clearance holes 94 are present at hole positions A, C, E and G.

When the driving shaft 18 rotates the coupling 314 in the direction $D_2$ (FIGS. 7, 8 and 14), the first chord 166a in each first flex element 62 is in tension, the second chord 166b is in compression, and the third chord 166c is in tension. Also when the driving shaft 18 rotates in the direction $D_2$, the first chord 166a in each second flex element 62 is in tension, the second chord 166b is in compression, and the third chord 166c is in tension. Thus, when the flexible coupling 314 is rotated in the direction $D_2$, each pair 60, 74 of flex elements 62 includes four tension chords and two compression chords. If the coupling 314 is rotated in the direction $D_1$, the loading on the chords is reversed and each pair 60, 74 of flex elements 62 includes only two tension chords and four compression chords. The coupling 314 therefore has a greater capacity to transmit torque in the direction $D_2$ than in the direction $D_1$, and therefore has a torque transmission capacity biased in the direction of $D_2$. When rotated in the direction $D_1$, opposite direction $D_2$, the flexible coupling 314 is capable of transmitting about 50% of the torque transmissible in direction $D_2$.

FIG. 11 illustrates a coupling 414 which is a fourth embodiment of the invention, which is provided by the system 10, and which includes a fourth set 416 of the hubs 42, 46. Except as otherwise described, the coupling 414 including the fourth set 416 of hubs is identical to the coupling 14 and common elements are identified by common reference numerals.

The fourth set 416 of hubs, when connected by a set 60 of flex elements 62 and a set of fastener assemblies 66, provides a coupling having a bidirectional torque transmission capacity. However, unlike the coupling 14, the coupling 414 does not include a center member. The fourth set 416 of hubs includes the first hub 42 and the second hub 46 having respective flanges. In the first hub flange 82, bolt holes 90 are present at hole positions C, E, F and H, and clearance holes 94 are present at hole positions A, B, D and G. In the second hub flange 98, though partially obscured in FIG. 11, bolt holes 90 are present at hole positions A, B, D and G, and clearance holes 94 are present at hole positions C, E, F, and H. The arrangements of bolt holes 90 and clearance holes 94 in the first and second hubs 42, 46 are identical to the arrangements of the bolt holes 90 and clearance holes 94 in the first hub flange 82 and first center member flange 118 in the coupling 14 shown in FIGS. 1–4, and the bidirectional torque transmission capacities resulting therefrom are also comparable. In other embodiments, a coupling not including a center member can provide biased torque transmission capacity similar to couplings including a center member.

FIGS. 9, 10, 15 and 16 illustrate a coupling 514 which is a fifth embodiment of the invention, which is provided by the system 10, and which includes a fifth set 518 of hubs 526, 530 and a center member 522. Except as otherwise described, the coupling 514 including the fifth set 518 of hubs and center member is identical to the coupling 14 and common elements are identified by common reference numerals.

More particularly, the fifth set 518 includes a first hub 526 having a flange 534, a second hub 530 having a flange 538, and a center member 522 having flanges 544 and 548. When connected by sets 60, 74 of flex elements 62 and a set of fastener assemblies 66, the set 518 provides a coupling 514 having a torque transmission capacity which is biased in one of the directions of rotation $D_1$ or $D_2$. The coupling 514 assembled with the fifth set 518 of hubs and center member also includes convertible means 542 for alternatively connecting the first and second hub flanges 534, 538, the center member flanges 544, 548, the first and second pairs 60, 74 of flex elements 62, and the set of fastener assemblies 66 in a first arrangement (shown in FIGS. 9, 10 and 15) wherein said coupling 514 has a torque transmission capacity biased in the direction $D_1$, and in a second arrangement (shown in FIG. 16) wherein the coupling has a torque transmission capacity biased in the other direction of rotation, i.e. in direction $D_2$. While various suitable constructions for the convertible means 542 can be used, in the illustrated coupling 514 (shown in FIGS. 10, 15 and 16), the convertible means includes the provision of unequal numbers of bolt holes 90 and clearance holes 94 in the first and second hub flanges 534, 538 and in the central member flanges 544, 548. In particular, the first and second hub flanges 534, 538 have therein six bolt holes 90 rather than four (as provided in the first set of hubs in the coupling 14), i.e. three pairs of bolt holes 90 rather than two, but only four clearance holes 94, i.e. two pairs of clearance holes 94. Thus, the convertible means 542 provides n number of pairs of bolt holes 90 (wherein n=three) and n−1 number of pairs of clearance holes 94, i.e. two pairs of clearance holes in the first and second hub flanges 534, 538. Also, the center member flanges 544, 548 have therein six clearance holes 94 rather than four (as provided in the first set of hubs in the coupling 14), i.e. three pairs of clearance holes 94 instead of two, but only four bolt holes 90. Thus, the convertible means 542 provides n pairs of clearance holes 94 (wherein n=three) and n−1 pairs of bolt holes 90, i.e. two pairs of bolt holes in each of the center member flanges 544, 548.

Two of the six bolt holes 90 in the first and second hub flanges 534, 538 and two of the six clearance holes 94 in the first and second central member flanges 544, 548 are located at two hole positions which are in addition to hole positions A–H. One of the additional hole positions is identified as hole position I and is located between hole position B and hole position C at approximately the 50% position. The second additional hole position is identified as hole position J and is located 180° from hole position I at about the 230° position between hole position F and hole position G.

The provision of two additional bolt holes 90 located at the additional hole positions in the hub flanges 534, 538 and two additional clearance holes 94 located at the additional hole positions in the center member flanges 544, 548 is the result of superimposing the patterns of bolt holes 90 and clearance holes 94 of the sets 50, 316 of biased torque capacity hubs respectively illustrated in FIGS. 13 and 14. The arrangements of bolt holes 90 and clearance holes 94 are superimposed by rotating one of the arrangements, e.g., the arrangement shown in FIG. 6, through 50° (clockwise) and thereafter superimposing it on single flanges including the arrangements shown in FIG. 8.

More particularly, as shown in FIGS. 9, 10, 15 and 16, in the first and second hub flanges 534, 538, six bolt holes 90 are present at hole positions B, I, D, F, J and H; and four clearance holes 94 are present at hole positions A, C, E, and G. As shown in FIG. 9, the first and second central member flanges 544, 548 have therethrough four bolt holes 90 located at hole positions A, C, E, and G, and have therethrough six clearance holes 94 located at hole positions B, I, D, F, J and H. The first and second hubs 526, 530 are connected to the center member 522 by two pairs 60, 74 of flex elements and by a set of fastener assemblies 66; no additional flex elements 60 or fastener assemblies 66 are needed to connect the hubs 526, 530 and center member 522, because two of the bolt holes 90 in the first hub 526, two of the bolt holes 90 in the second hub 530, and two of the clearance holes 94 in each center member flange 544, 548 remain unoccupied when the coupling 514 is assembled.

In order to arrange the first and second hubs 526, 530, flex elements 60 and fastener assemblies 66 to provide a coupling having a torque transmission capacity biased in the direction of $D_1$, the first hub flange 534 must be aligned with the first center member flange 544, and the second hub flange 538 must be aligned with the second center member flange 548 in positions corresponding to those shown in FIGS. 9, 10 and 15. The pair 60 of flex elements 62 between flanges 534 and 544 are aligned with hole positions B–E and F–A to leave the holes at I and J unoccupied; the pair 74 of flex elements 62 between flanges 548 and 538 are aligned with holes C–J and G–I to leave the holes at B and F unoccupied; and an entire set of sixteen fastener assemblies 66 is then installed to connect the first and second hubs 526, 530, the center member 522, and the flex elements 62. In such an arrangement, the bolt holes 90 at hole positions I and J in the first hub flange 534, the clearance holes 94 at positions I and J in the first center member flange 544, the clearance holes 94 at positions B and F in the second center member flange 548, and the bolt holes 90 at positions B and F in the second hub flange 538 remain unoccupied.

In order to arrange the first and second hubs, the sets 60, 74 of flex elements 62 and an entire set of fastener assemblies 66 in a second arrangement to provide a coupling having a torque transmission capacity biased in the direction of $D_2$, the first and second hubs 526, 530 are aligned with the center member flanges 544, 548 in the same positions shown in FIGS. 9, 10 and 15. However, the pairs 60, 74 of flex elements 62 are aligned differently. In particular, the pair 60 of flex elements 62 between flanges 534 and 544 are aligned with hole positions C–J and G–I to leave the holes at B and F unoccupied; the pair 74 of flex elements 62 between flanges 548 and 538 are aligned with holes B–E and F–A to leave the holes at I and J unoccupied; and an entire set of sixteen fastener assemblies 66 is then installed to connect the first and second hubs 526, 530, the center member 522, and the flex elements 62. In such an arrangement, the bolt holes 90 at hole positions B and F in the first hub flange 534, the clearance holes 94 at hole positions B and F in the first center member flange 544, the clearance holes 94 at hole positions I and J in the second center member flange 544, and the bolt holes 90 at hole positions I and J in the second hub flange 538 remain unoccupied.

One of the advantages provided by the coupling 514 including the fifth set 518 of hubs is that one hub and one center member can be used for the coupling 514, regardless of the direction of the torque transmission bias of the resultant coupling 514, i.e., a single hub and a single center member are convertible for use to provide a convertible coupling having a biased torque transmission capacity in either $D_1$ or $D_2$. Also, if no center member is required, the configuration of the fifth set of hubs can still be used to provide a convertible coupling having a biased torque transmission capacity in either $D_1$ or $D_2$, and a single hub can be used for both hubs.

The convertible means 542 also includes four blocking pin holes 570 in each of the first and second hub flanges 534, 538 and two blocking pins 574 adapted to be selectively insertable in two of the blocking pin holes 570 in each flange. The four blocking pin holes 570 are between hole positions A and B, I and C, E and F, and J and G. When a blocking pin 574 is located in a pin hole 570, a portion of the pin 574 extends from the flange face to prevent the flex elements 62 from passing thereover. The blocking pins 574 thus assure that the flex elements 62 are properly arranged for a particular direction of bias by eliminating one of the possible arrangements of the coupling 514. In particular, when it is required to align the flex elements 62 with the bolt holes 90 and clearance holes 94 for torque capacity biased in the direction $D_1$ a pair of the blocking pins 574 are inserted in the blocking pin holes 570 between hole positions A and B and hole positions E and F in the first hub flange 534, and a pair of the blocking pins 574 are inserted in the blocking pin holes 570 between hole positions I and C and hole positions J and G in the second hub flange 538. Conversely, when it is required to align the flex elements 62 with the bolt holes 90 and clearance holes 94 for torque capacity biased in the direction $D_2$, the blocking pins 574 are inserted in the blocking pin holes 570 between hole positions I and C and hole positions J and G in the first hub flange 534, and a pair of the blocking pins 574 are inserted in the blocking pin holes 570 between hole positions A and B and hole positions E and F in the second hub flange 538.

The convertible means 542 also includes indicia means 560 for aligning the hub flanges 534, 538 and the center member flanges 544, 548 and for indicating the blocking pin holes 570 into which blocking pins 574 must be inserted to assure that the flex elements 62 are properly arranged for a selected direction of bias $D_1$ or $D_2$. In the illustrated embodiment, the indicia means 560 are two pairs of oppositely directed arrows 578 imprinted on each hub flange 534, 538 and center member flange 544, 548. The hub flanges 534, 538 and the center member flanges 544, 548 are properly aligned when the arrows 578 on each flange are positioned adjacent the arrows 578 pointing the same direction on the adjacent flange. Each arrow 578 on a hub flange 534, 538 is adjacent one of the blocking pin holes 570 to provide guidance in assembling the coupling to provide a biased torque capacity in either selected direction $D_1$ or $D_2$. The arrows 578 on the first hub flange 534 which point in the desired direction $D_1$ or $D_2$ of biased torque capacity are adjacent the blocking pin holes 570 into which blocking pins 574 are inserted to properly align the flex elements 62 in the first pair 60 with the bolt holes 90 and clearance holes 94 to provide biased torque capacity in the desired direction $D_1$ or $D_2$. Because the first and second hubs 534 and 538 are otherwise identical, the arrows 578 on the second hub flange 538 which point opposite from the desired direction $D_1$ or $D_2$ of biased torque capacity are adjacent the blocking pin holes 570 into which blocking pins 574 are inserted to properly align the flex elements 62 in the second pair 74 with the bolt holes 90 and clearance holes 94 to provide biased torque capacity in the desired direction $D_1$ or $D_2$. Thus, when it is required to align the flex elements 62 with the bolt holes 90 and clearance holes 94 for torque capacity biased in the direction $D_1$, the blocking pins 574 are inserted in the first hub flange 534 in the blocking pin holes 570 adjacent the arrows 578 pointing in the direction $D_1$ and the blocking pins 574 are inserted in the second hub flange 538 in the blocking pin holes 570 adjacent the arrows 578 pointing opposite from the direction $D_1$, i.e., pointing in the direction $D_2$. Conversely, when it is required to align the flex elements 62 with the bolt holes 90 and *clearance holes 94 for torque capacity biased in the direction $D_2$, the blocking pins 574 are inserted in the first hub flange 534 in the blocking pin holes 570 adjacent the arrows 578 pointing in the direction $D_2$, and the blocking pins 574 are inserted in the second hub flange 538 in the blocking pin holes 570 adjacent the arrows 578 pointing opposite from the direction $D_2$, i.e., pointing in the direction $D_1$. Thus, the arrows 578 on the first hub flange 534 and first center member flange 544 respectively indicate the direction of rotation $D_1$ or $D_2$ in which the torque capacity of the coupling 514 will be biased when assembled with the blocking pins 574 inserted in the adjacent blocking pin holes 570 in the first hub flange 534. The oppositely directed arrows 578 on the second hub flange 538 and second center member flange 548 respectively indicate the direction of rotation $D_1$ or $D_2$ in which the torque capacity of the coupling 514 will be biased when assembled when the blocking pins 574 are inserted in the blocking pin holes 570 in the second hub flange 538. Thus, the blocking pins 574 assure that the flex elements 62 are aligned with the appropriate bolt holes 90 to provide the coupling 514 with a biased torque capacity in the intended direction of rotation. With the arrows 578 aligned with the arrows on adjacent flanges and with the blocking pins 574 inserted in a pair of blocking pin holes 570 in each hub flange 534, 538, the flex elements 62 can only be installed in one alignment with the bolt holes 90 and clearance holes 94.

The couplings provided by the system 10 are assembled using common sets of flex elements 62 and fastener assemblies 66. The couplings differ only in the configuration of the sets of hubs used to determine the torque transmission characteristics of the coupling, and upon the provision of a center member. The system 10 thus provides means for connecting a first set of hubs and a center member, a pair of flex elements and a set of fasteners to provide a coupling having a biased torque transmission capacity and alternatively for connecting a second set of hubs and a center member, a pair of flex elements and the entire set of fasteners to provide a coupling having a bidirectional torque transmission capacity.

Other features and advantages of the invention are set forth in the following claims.

I claim:

1. A coupling for connecting a first shaft which is rotatable in a first direction and which is rotatable in a second direction and a second shaft which is rotatable in the first direction and in the second direction, said coupling comprising:

a first hub adapted to be connected to the first shaft and a first hub flange extending radially from the first hub, said first hub flange having extending therethrough a predetermined number of fastener holes and having extending therethrough a plurality of clearance holes, the plurality of clearance holes numbering fewer than the predetermined number of fastener holes in the first hub flange, the fastener holes and clearance holes in the first hub flange being spaced circumferentially about the first hub flange, a second hub adapted to be connected to the second shaft and having a second hub flange extending radially from the second hub, said second hub flange having extending therethrough a plurality of fastener holes numbering equal to the predetermined number of fastener holes in the first hub flange, the second hub flange having extending therethrough a plurality of clearance holes, the plurality of clearance holes in the second hub flange numbering equal to the plurality of clearance holes in the first hub flange, the fastener holes and clearance holes in the second hub flange being spaced circumferentially about the second hub flange, a plurality of flex elements located between said first hub and said second hub, and a plurality of fastener assemblies, each fastener assembly including a bolt having a head, a threaded shank extending from the head, and a nut on the shank, each fastener assembly connecting a flex element with either the first or the second hub and said plurality of flex elements and said plurality of fastener assemblies being interconnected with the first and second hubs so that at least one fastener hole of the plurality of fastener holes in the first hub flange is unoccupied by a fastener assembly and so that at least one fastener hole of the plurality of fastener holes in the second hub flange is unoccupied by a fastener assembly whereby said coupling has a capacity to transfer torque from the first shaft to the second shaft that is greater when the first and second shafts rotate in the first direction of rotation than when the first and second shafts rotate in the second direction.

2. A coupling as set forth in claim 1 wherein the plurality of fastener holes and the plurality of clearance holes in the first hub flange and the plurality of fastener holes and the plurality of clearance holes in the second hub flange are respectively circumferentially arranged about the first hub flange and the second hub flange in pairs of diametrically opposed fastener holes and in pairs of diametricallytopposed pairs of clearance holes.

3. A coupling as set forth in claim 1 wherein said predetermined number of fastener holes in the first hub flange includes n pairs of fastener holes and wherein the plurality of clearance holes in the first hub flange includes n−1 pairs of clearance holes.

4. A coupling as set forth in claim 1 wherein the first hub flange has therein a first pair of blocking pin holes, wherein the second hub flange has therein a second pair of blocking pin holes, and further comprising a pair of blocking pins, one of the pair of blocking pins being received by one of the blocking pin holes in the first hub flange and the other of the pair of blocking pins being received by one of the second pair of blocking pin holes.

5. A coupling as set forth in claim 1 wherein the first hub includes a first marking and wherein the second hub includes a second marking, the first and second markings indicating the direction rotation in which the coupling has the greater capacity to transmit torque.

6. A coupling as set forth in claim 5 wherein the first hub includes a first pair of blocking pin holes, wherein the second hub includes a second pair of blocking pin holes, and further comprising a first blocking pin received by one of the first pair of blocking pin holes and a second blocking pin received by one of the second pair of blocking pin holes, and wherein the first and second markings respectively further indicate the blocking pin hole of the first and second pairs of blocking pin holes in which the first and second blocking pins are received.

7. A coupling as set forth in claim 1 wherein each of the plurality of flex elements has opposite ends and an arcuate extent between said opposite ends, said arcuate extent defining at least four apertures and three chords extending between said apertures.

8. A coupling as set forth in claim 7 wherein the plurality of flex elements are arranged in end to end relation.

9. A coupling for connecting a first shaft which is rotatable in a first direction and which is rotatable in a second direction and a second shaft which is rotatable in the first direction and in the second direction, said coupling comprising: a first hub adapted to be connected to the first shaft and a first hub flange extending radially from the first hub, said first hub flange having extending therethrough a first fastener hole and a second fastener hole and having extending therethrough a first clearance hole, the first and second fastener holes and the first clearance hole in the first hub flange being spaced circumferentially about the first hub flange, a second hub adapted to be connected to the second shaft and having a second hub flange extending radially from the second hub, said second hub flange having extending therethrough a first fastener hole and a second fastener hole and the second hub flange having extending therethrough a first clearance hole, the first and second fastener holes and first clearance hole in the second hub flange being spaced circumferentially about the second hub flange, a flex element located between said first hub flange and said second hub flange, a plurality of fasteners respectively connecting the flex element and one of the first and second hubs, the flex element and the fasteners being interconnected with the hubs so that the first fastener hole in the first hub flange is occupied by a fastener and so that the second fastener hole in the first hub flange is unoccupied by a fastener and so that the first fastener hole in the second hub flange is occupied by a fastener and so that the second fastener hole in the second hub flange is unoccupied by a fastener to provide the coupling with a torque transmission capacity that is biased in the first direction of rotation.

10. A coupling as set forth in claim 9 wherein the first hub flange has extending therethrough a plurality of fastener holes including the first and second fastener holes in the first hub flange and has extending therethrough a plurality of clearance holes including the first clearance hole in the first hub flange, and wherein second hub flange has extending therethrough a plurality of fastener holes including the first and second fastener holes in the second hub flange and has extending therethrough a plurality of clearance holes including the first clearance hole in the second hub flange.

11. A coupling as set forth in claim 10 wherein the number of clearance holes in the first hub flange is equal to the number of clearance holes in the second hub flange and wherein the number of fastener holes in the first hub flange is equal to the number of fastener holes in the second hub flange.

12. A coupling as set forth in claim 9 wherein said predetermined number of fastener holes in the first hub includes n pairs of fastener holes and wherein the plurality of clearance holes in the first hub flange includes n−1 pairs of clearance holes.

13. A coupling for connecting a first shaft which is rotatable in a first direction and which is rotatable in a second direction and a second shaft which is rotatable in the first direction and in the second direction, said coupling comprising: a first hub adapted to be connected to the first shaft and a first hub flange extending radially from the first hub, said first hub flange having extending therethrough a predetermined number of fastener holes and having extending therethrough a plurality of clearance holes, the plurality of clearance holes numbering fewer than the predetermined number of fastener holes in the first hub flange, a second hub adapted to be connected to the second shaft and having a second hub flange extending radially from the second hub, said second hub flange having extending therethrough a plurality of fastener holes numbering equal to the predetermined number of fastener holes in the first hub flange, the second hub flange having extending therethrough a plurality of clearance holes, the plurality of clearance holes in the second hub flange numbering equal to the plurality of clearance holes in the first hub flange, a plurality of flex elements located between said first hub and said second hub, and a plurality of fastener assemblies, each fastener assembly including a bolt having a head, a threaded shank extending from the head, and a nut on the a shank, each fastener assembly connecting a flex element with one of the first and the second hub and having a portion extending into a respective clearance hole in the one of the first hub flange and the second hub flange, said plurality of flex elements and each of said plurality of fastener assemblies being interconnected with the first and second hubs in an arrangement wherein one of the fastener holes in the first hub flange is unoccupied by a fastener assembly so that said coupling has a capacity to transfer torque from the first shaft to the second shaft that is greater when the first and second shafts rotate in the first direction of rotation than when the first and second shafts rotate in the second direction.

14. A coupling as set forth in claim 13 and wherein one of the fastener holes in the second hub flange is unoccupied by a fastener assembly.

15. A coupling for connecting a first shaft which is rotatable in a first direction and which is rotatable in a second direction and a second shaft which is rotatable in the first direction and in the second direction, said coupling comprising:

a first hub adapted to be connected to the first shaft and a first hub flange extending radially from the first hub, the first hub flange defining a first hub flange face and the first hub flange having extending therethrough a predetermined number of fastener holes and having extending therethrough a plurality of clearance holes, the plurality of clearance holes numbering fewer than the predetermined number of fastener holes in the first hub flange, a second hub adapted to be connected to the second shaft and having a second hub flange extending radially from the second hub, the second hub flange defining a second hub flange face and having extending therethrough a plurality of fastener holes numbering equal to the predetermined number of fastener holes in the first hub flange, the second hub flange having extending therethrough a plurality of clearance holes, the plurality of clearance holes in the second hub flange numbering equal to the plurality of clearance holes in the first hub flange, a center member located between the first and second hubs and including a first center member flange defining a first center member flange face in opposed facing relation to said first hub flange face, the first center member flange having extending therethrough a predetermined number of fastener holes and having extending therethrough a plurality of clearance holes, the plurality of clearance holes in the first center member flange numbering greater than the predetermined number of fastener holes in the first center member flange, the center member including a second center member flange defining a second center member flange face in opposed facing relation to said second hub flange face, the second center member flange having extending therethrough a plurality of fastener holes numbering equal to the number of fastener holes in the first center member flange and having extending therethrough a plurality of clearance holes numbering equal to the number of clearance holes in the first center member flange, a plurality of flex elements located between the first hub and the first center member flange and between the said second hub and the second center member flange, and a plurality of fastener assemblies, each fastener assembly including a bolt having a head, a threaded shank extending from the head, and a nut on the a shank, each fastener assembly connecting a flex element with one of the first hub, the second hub, the first center member flange and the second center member flange.

16. A coupling as set forth in claim 15 wherein the fastener holes in the first center member flange respectively align with the clearance holes in the first hub flange, and wherein the clearance holes in the first center member flange respectively align the fastener holes in first hub flange.

17. A coupling as set forth in claim 15 wherein the fastener holes in the first center member flange respectively align with the fastener holes in the second center member flange, and wherein the clearance holes in the first center member flange respectively align the clearance holes in second center member flange.

18. A coupling as set forth in claim 15 wherein the fastener holes and clearance holes in the first hub flange are spaced circumferentially about the first hub flange, wherein the fastener holes and clearance holes in the second hub flange are spaced circumferentially about the second hub flange, wherein the fastener holes and clearance holes in the first center member flange are spaced circumferentially about the first center member flange, and wherein the fastener holes and clearance holes in the second center member flange are spaced circumferentially about the second center member flange.

19. A coupling for connecting a first shaft which is rotatable in a first direction and which is rotatable in a second direction and a second shaft which is rotatable in the first direction and in the second direction, said coupling comprising:

a first hub adapted to be connected to the first shaft and a first hub flange extending radially from the first hub, said first hub flange having extending therethrough a predetermined number of fastener holes and having extending therethrough a plurality of clearance holes, the plurality of clearance holes numbering fewer than the predetermined number of fastener holes in the first hub flange, the first hub flange having therein a first pair of blocking pin holes, a second hub adapted to be connected to the second shaft and having a second hub flange extending radially from the second hub, said second hub flange having extending therethrough a plurality of fastener holes numbering equal to the predetermined number of fastener holes in the first hub flange, the second hub flange having extending therethrough a plurality of clearance holes, the plurality of clearance holes in the second hub flange numbering equal to the plurality of clearance holes in the first hub flange, the second hub flange having therein a second pair of blocking pin holes, a first blocking pin received by one of the blocking pin holes in the first hub flange, a second blocking pin received by one of the blocking pin holes in the second hub flange, a plurality of flex elements located between said first hub and said second hub, and a plurality of fastener assemblies, said plurality of flex elements and each of said plurality of fastener assemblies being interconnected with the first and second hubs so that said coupling has a capacity to transfer torque from the first shaft to the second shaft that is greater when the first and second shafts rotate in the first direction of rotation than when the first and second shafts rotate in the second direction, and said first and second hubs when the first blocking pin is received by one of the blocking pin holes in the first hub flange and when the second blocking pin is received by one of the blocking pin holes in the second hub flange, and wherein said first and second hubs, said plurality of flex elements and each of said plurality of fastener assemblies can be interconnected in an alternative arrangement wherein said first blocking pin is received by the other blocking pin hole in the first hub flange and said second blocking pin is received by the other blocking pin hole in the second hub flange such that said coupling has a capacity to transfer torque from the first shaft to the second shaft that is greater when the first and second shafts rotate in the second direction of rotation than when the first and second shafts rotate in the first direction of rotation.

20. A coupling as set forth in claim 19 wherein the first hub includes a first marking and wherein the second hub includes a second marking, the first and second markings indicating the direction rotation in which the coupling has the greater capacity to transmit torque.

* * * * *